Patented Feb. 8, 1927.

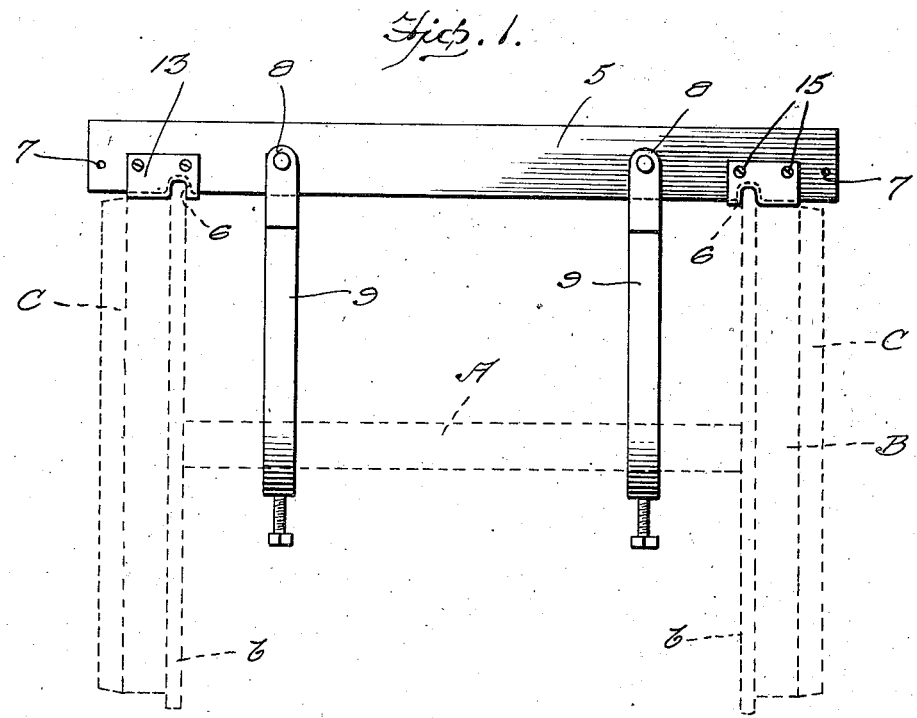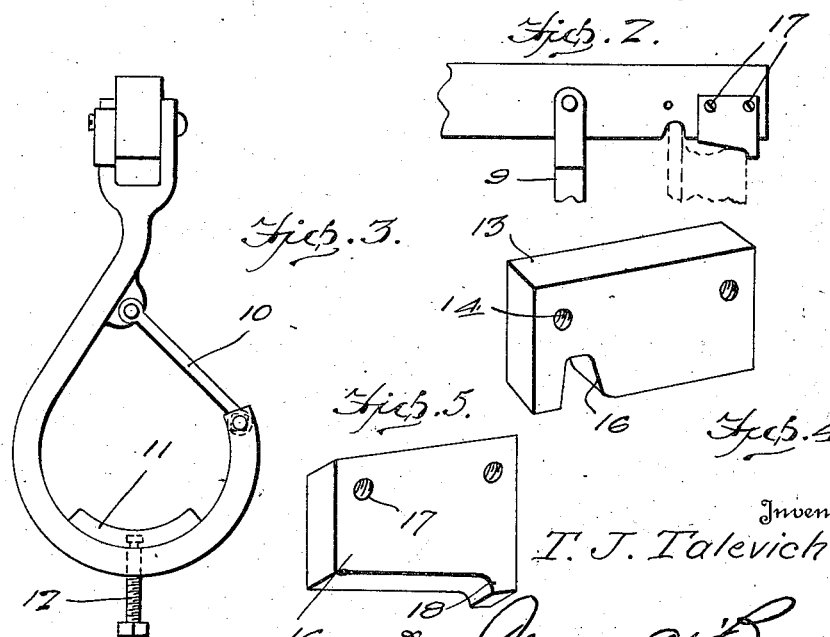

1,617,036

UNITED STATES PATENT OFFICE.

TOM J. TALEVICH, OF SAPULPA, OKLAHOMA.

LOCOMOTIVE DRIVING-WHEEL TRUING AND FLANGE-REDUCING DEVICE.

Application filed August 8, 1924. Serial No. 730,996.

This invention relates to a locomotive driving wheel truing and flange reducing device, and the primary object thereof resides in the provision of such a device, that may be attached directly to the locomotive for accomplishing these results while the locomotive is being moved slowly along the track, for thereby overcoming the necessity of removing the wheels from the locomotive and truing and reducing the wheel flanges in the work shop.

An additional object of my invention is to provide a device of this character that may be readily attached to or removed from the locomotive, and wherein the circumference of the wheel flanges may be formed, or be reduced or the wheel tread may be trued as desired, and wherein the proper adjustment of the device may be made simultaneously with the movement of the locomotive over the track.

With the foregoing and other objects in view, as the nature of the invention will be better understood, the same comprises the novel form, combination and arrangement of parts hereinafter more fully described, shown in the accompanying drawings and claimed.

In the drawings, wherein like reference characters indicate corresponding parts throughout the several views:

Figure 1 is a top plan view of the locomotive driving wheel truing and flange reducing device constructed in accordance with the present invention, the same being shown as actually used, for the flange forming and reducing operation.

Figure 2 is a fragmentary top plan view of the device, showing one of the cutters associated therewith for use during the truing and bevelling of the wheel tread.

Figure 3 is an end elevational view of the device per se, and

Figures 4 and 5 are perspectives of the different forms of cutters employed in conjunction with the present invention.

Now having particular reference to Figure 1 of the drawings, there is shown in dotted lines a locomotive axle designated A, upon the opposite ends of which are fixed the usual supporting wheels B—B.

My invention, per se, constitutes the provision of a flat horizontal bar 5—5 of a suitable metal, the inner edge of which is formed adjacent its opposite end with notches 6—6 for a purpose hereinafter to be more fully described. This bar 5 is also formed at its inner edge and at opposite ends with spaced openings 7, also for a purpose to be hereinafter described.

Pivotally secured to the bar 5 at the points 8—8 are the inner yoked ends of rearwardly extending spaced clevises 9—9 that are adapted to be engaged over the locomotive axle A, as clearly shown in Figure 1, these clevises being maintained in position over the axle through the medium of pivoted links 10 carried by said clevises as more clearly shown in Figure 3. Upon the inner side of each clevis at the hooked end thereof is a curvilinear axle engaging plate 11, that is carried by the inner end of a screw bolt 12 threaded in an opening of the clevis for obviously allowing said plate to be adjusted toward or away from the axle, for providing means for drawing the bar 5 toward the locomotive driving wheels B—B.

In the use of the device for reducing the circumferential area of the wheel flanges b—b, cutters 13—13 of high speed steel are associated with the horizontal bar 5, in a manner as clearly shown in Figure 1.

These cutters 13 are of plate like formation, and are formed at their forward edges and at opposite ends with screw threaded openings 14 for registration with the innermost two of the openings at opposite ends of the bar 5, which are also screwthreaded, whereby the cutters may be rigidly secured to the bars through the medium of set screws 15. The inner edges of these cutters are formed adjacent opposed ends with notches 16, the uppermost edges of which are sharpened, said notches being adapted to receive the flanges b—b of the wheels B—B whereby, when the device is applied, and the locomotive moved slowly along the track, the flanges will be cut to the desired circumferential area. For truing the faces of the wheels B—B and for providing bevelled outer edges C—C I provide cutters 16, that are also provided with a screw threaded opening 17, for registration with the outermost opening at opposite ends of the bar 5 to be secured thereto also through the medium of set screws 17. The inner edges of these cutters are inclined and provided with rearwardly extending lugs 18 that engage over the edges of the wheel tread, as clearly shown in Figure 2, it being obvious that when these forms of cutters are applied to the bar 5 and the device applied as shown in Figure 2, a movement of the locomotive over the track will true the flanges of the wheels as well as providing the bevel c—c of the wheels. It will be apparent that the bar 5 is prevented from rotation with the wheel, by the truck structure mounted or supported on the axle A.

It will thus be seen that I have provided a highly novel and efficient device for truing locomotive wheels and reducing the flanges of said wheels, without the necessity of removing the wheels from the locomotive, as the same are necessary in accomplishing these objects.

Minor changes may be made in the invention without departing from the spirit and scope of the appended claims.

Having thus described my invention, what I claim as new and desire to secure by Letters Patent is:

1. In a device of the character described, a supporting beam, blades mounted on the supporting beam, arms removably connected to the supporting beam and having curved portions adapted to fit over an axle, and means carried by the arms and adapted to engage the axle for moving the supporting beam towards the axle.

2. In a device of the character described, a supporting beam, blades mounted at the ends of the supporting beam, arms carried by the supporting beam and having curved portions adapted to embrace portions of an axle carrying wheels, screws extending through the arms, and axle engaging members carried by the screws, said screws adapted to be operated to move the blades into engagement with the wheels on the axle.

In testimony whereof I affix my signature.

TOM J. TALEVICH.